Patented Feb. 6, 1934

1,945,551

UNITED STATES PATENT OFFICE

1,945,551

MANUFACTURE OF PIGMENTS BY WET-PRECIPITATION

William C. Hooey and Edmund J. Flynn, Palmerton, Pa., assignors to The New Jersey Zinc Company, New York, N. Y., a corporation of New Jersey No Drawing. Application December 12, 1928
Serial No. 325,644

8 Claims. (Cl. 134—78)

This invention relates to the manufacture of pigments by wet-precipitation and has for its object certain improvements in the method of manufacturing pigments by wet-precipitation. The invention more particularly relates to improvements in the manufacture of lithopone, zinc sulfide, and the like by wet-precipitation.

Lithopone is a white pigment composed of zinc sulfide (ZnS) and barium sulfate (BaSO₄). In the manufacture of lithopone aqueous solutions of barium sulfide (BaS) and zinc sulfate (ZnSO₄) are mixed in about molecular proportions, usually in the presence of some suitable electrolyte, such as sodium chloride. Upon the mixing of these solutions there results a heavy, flocculent, white co-precipitate consisting of an intimately associated admixture of zinc sulfide and barium sulfate in accordance with the reaction:

(1) $BaS + ZnSO_4 \rightarrow ZnS + BaSO_4$ 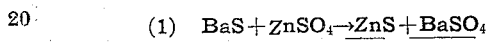

The co-precipitate is washed, filter-pressed and dried. The dried product is known in the industry as "crude lithopone". It has a low degree of brightness; is far from perfect white in color; and possesses low strength or hiding power. Crude lithopone is, therefore, totally unsuited for paint purposes, but when it is heated, say to a temperature of 650–900° C., and suddenly cooled in the absence of air, as by plunging (quenching) into cold water, its physical properties are so modified as to adapt it for paint purposes. The quenched material is then wet ground, dried and disintegrated to suitable fineness, and is known in the industry as lithopone. While lithopone is chiefly employed in paints, it is also extensively used as a filler for rubber goods, linoleum and the like.

The best grades of lithopone are made, other factors being equal, with barium sulfide and zinc sulfate liquors that are pure or substantially pure. The so-called "barium sulfide" liquor is prepared by subjecting barytes (BaSO₄) to a reduction operation, in the presence of a carbonaceous reducing agent, such as coal, and leaching the furnace product, black ash, with water. The main reduction reaction may be indicated as follows:

(2) $BaSO_4 + 2C \rightarrow BaS + 2CO_2$ 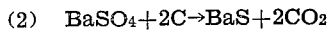

The zinc sulfate liquor is usually prepared by treating various zinc-bearing materials, such as refuse zinc oxide, scrap metallic zinc, galvanizing dross, ores, concentrates and the like with sulfuric acid. A substantial part of the available zinc, as well as other acid soluble metals, is extracted by this acid treatment. In order to purify the resulting zinc sulfate liquor, various measures are employed. For example, the acid liquor is made basic by the addition of appropriate amounts of zinc oxide or the like, and such heavy metals as iron, manganese and the like are removed by oxidation with bleaching powder (hypochlorite of lime), permanganate, lead peroxide and the like. Cadmium, copper, nickel, cobalt and the like are generally removed from the zinc sulfate liquor by precipitation with zinc dust or zinc metal. Such organic precipitants as dimethylglyoxime have been suggested for the removal, more particularly, of nickel and cobalt.

The purification steps heretofore employed in the preparation of zinc sulfate liquors have not effected the removal of magnesium and its compounds, at least not in appreciable amounts. The zinc-bearing materials commonly used, such as zinc oxide, scrap metallic zinc, galvanizing dross and the like very seldom contain appreciable amounts of magnesium or its compounds. In fact, the presence of magnesium in zinc sulfate liquor as an objectionable impurity generally becomes a problem only when the zinc sulfate liquor is obtained from raw zinc-bearing material, such as ores, and concentrates, containing magnesium or its compounds. These magnesium compounds are generally present as carbonates, silicates, aluminates, etc., or in oxidized or roasted ores also as oxides and/or sulfates. When zinc ores or concentrates, which frequently contain compounds of magnesium, are subjected to a sulfuric acid treatment to obtain zinc sulfate liquor, a very substantial amount of the available acid soluble magnesium is also extracted as magnesium sulfate. Investigation has shown that the presence of relatively small amounts of magnesium, as small a proportion as one or two parts of magnesium to 1000 parts of zinc, in the zinc sulfate liquor exerts a deleterious effect on various steps of the lithopone manufacturing process, as well as on the final lithopone product itself.

A better understanding of the harmful effects of the presence of magnesium sulfate in zinc sulfate liquor employed in the manufacture of lithopone will be had by considering in brief detail its influence on various steps of the process and on the co-precipitate at various points in its evolution to a finished lithopone product.

When barytes are subjected to the reduction operation mentioned above, in accordance with Equation (2), appreciable amounts of barium oxide (BaO) are also frequently formed. The reaction may take place in this manner:

(3) $BaSO_4 + C \rightarrow BaO + SO_2 + CO$

During the subsequent leaching operation, both the barium sulfide and barium oxide are extracted by the water.

In the preparation of the "barium sulfide" liquor, it will be recalled that the black ash obtained from the baryte furnace is leached with water to extract the available barium sulfide.

Recent investigations have shown that regard should be taken of the fact that both the barium sulfide and the barium oxide are hydrolyzed—the barium sulfide forming barium hydrate and barium sulfhydrate; and the barium oxide forming barium hydrate—according to the following reactions:

(4) $2BaS + 2H_2O \rightarrow Ba(OH)_2 + Ba(SH)_2$ or $2Ba\begin{smallmatrix}SH\\OH\end{smallmatrix}$ (5) $BaO + H_2O \rightarrow Ba(OH)_2$ or $Ba\begin{smallmatrix}OH\\OH\end{smallmatrix}$ The simple main precipitating reaction (1) above set out, when so-called "barium sulfide" and zinc sulfate liquors are brought together, may then more accurately be indicated as follows:

(6) $Ba(SH)_2 + Ba(OH)_2 + 2ZnSO_4 \rightarrow 2BaSO_4 + 2ZnS + 2H_2O$

When magnesium sulfate is present in the zinc sulfate liquor, a secondary reaction or reactions, takes place:

(7) $MgSO_4 + Ba(OH)_2 \rightarrow BaSO_4 + Mg(OH)_2$ (8) $2MgSO_4 + Ba(OH)_2 + Ba(SH)_2 + 2H_2O \rightarrow 2BaSO_4 + 2Mg(OH)_2 + 2H_2S$ The magnesium sulfate appears to react selectively with the barium hydrate, forming by double decomposition a co-precipitate of magnesium hydrate, which is only slightly soluble in water, and barium sulfate.

The barium sulfate content of the crude pulp is relatively increased, and the zinc sulfide content is relatively decreased, because the secondary reaction has itself produced barium sulfate. In other words, for a given amount and content of so-called "barium sulfide" liquor and zinc sulfate liquor, a given amount of barium sulfate will be formed by the main reaction (1) above to satisfy the available zinc going into zinc sulfide. The magnesium sulfate present in the zinc sulfate liquor will, however, also react with the barium sulfide liquor to form additional barium sulfate but necessarily no zinc sulfide. The net result of the secondary reaction is to decrease the ratio of zinc sulfide in the crude pulp and, therefore, to decrease the hiding power of the ultimate finished lithopone because the hiding power of the finished lithopone is largely a function of its zinc sulfide content.

There are other harmful effects from the secondary reaction both in the remaining steps of the lithopone making process and the final product.

The crude pulp is then composed of co-precipitated zinc sulfide, barium sulfate and magnesium hydrate. In the co-pending applications, Serial Nos. 75,621 and 75,622, filed December 15, 1925, (which have since issued, May 20, 1930, as Patents 1,759,115 and 1,759,116, respectively), there are disclosed certain improvements in the manufacture of lithopone, by which in brief a crude pulp containing a certain predetermined excess of hydrate or excess and ratio of hydrate to sulfhydrate is obtained in order to secure finished lithopone pigments that are uniform in quality and that have certain desired physical properties. These results are preferably obtained by establishing the predetermined excess and ratio of hydrate to sulfhydrate at the end point of the precipitating step.

If magnesium sulfate is present in the crude pulp, when the hydrate-sulfhydrate control disclosed in the aforementioned co-pending applications is attempted, the end point of the main precipitating step is disturbed. This result is due to the destruction or removal of the excess hydrate, in conformity with the secondary reactions set out in Equations (7) and (8) above. As was noted, the magnesium sulfate present in the zinc sulfate liquor tends selectively to react with the barium hydrate present in the "barium sulfide" liquor to form co-precipitated magnesium hydrate and barium sulfate. The hydrate-sulfhydrate control disclosed in the copending applications is preferably predicated on the end point of the main reaction (1) or (6) above. The effect of the secondary reaction is to disturb the equilibrium of hydrate-sulfhydrate that would obtain in the crude pulp if magnesium sulfate were not present in the zinc sulfate liquor. It is therefore extremely difficult definitely to fix or control the excess of hydrate or the excess and ratio of hydrate to sulfhydrate at the end point of the main precipitation step.

If magnesium sulfate is present in the zinc sulfate liquor, the crude pulp, prepared in accordance with the prior art practice as well as by the method disclosed in the aforementioned co-pending applications, consists of co-precipitated zinc sulfide, barium sulfate and magnesium hydrate, together with an excess of barium hydrate-sulfhydrate. The crude pulp is filtered and dried, to form crude lithopone.

In the drying operation, which is commonly carried out by blowing heated air into tunnel dryers, the zinc sulfide in the crude lithopone is subjected to oxidizing influences:

(9) $2ZnS + 3O_2 \rightarrow 2ZnO + 2SO_2$

The susceptibility of zinc sulfide in crude lithopone to oxidation at low temperatures has been quite strikingly brought out by two or three instances of spontaneous combustion which have taken place in storage bins containing dried crude lithopone. At these times temperatures as high as 700° C., have been observed, and analyses have shown a considerable conversion of zinc sulfide to zinc oxide. It is worthy of note that these cases of spontaneous combustion have occurred in crude lithopones made from magnesia-zinc-bearing material. If, however, the barium hydrate destroyed or removed from the crude lithopone as a result of the presence of magnesium sulfate in the zinc liquor has been replaced by the additions of barium hydrate, as outlined in the aforementioned applications, this excess of barium hydrate in the crude lithopone will not only act as a protective agent to prevent oxidation of the zinc sulfide, but it will also absorb such acid gases as $CO_2$, $SO_2$, etc., that may be present in the air.

The crude lithopone after drying should be appropriately calcined in order to convert it into a suitable pigment. While this operation is preferably carried out in the absence of air to avoid undue oxidation of the zinc sulfide, it may not always be possible to attain a complete absence of air or of other oxidizing influences. In the case of crude lithopone made from zinc sulfate liquors containing magnesium sulfate, the zinc sulfide is subjected to more or less oxidation unless the barium hydrate destroyed or removed from the crude lithopone at the precipitation stage has been replaced by additions of barium hydrate. In this case the barium hydrate performs a protective function similar to that mentioned in the drying operation.

Another difficulty encountered in the calcination operation of crude lithopone made from magnesium-bearing zinc sulfate liquors is a retardation of the calcining operation, that is, a longer time is required for calcining at a given temperature in order to bring the final product to its optimum pigmentary properties.

In the aforementioned co-pending applications, it is disclosed that the physical properties (oil absorption, incorporation in oil, light resistance, etc.) of the finished lithopone, which are largely fixed in the calcination stage, are controlled or varied by the excess and ratio of barium hydrate to sulfhydrate established in the crude pulp at the end point of the precipitating step. Accordingly, if the barium hydrate excess in the crude lithopone has been removed or destroyed by magnesium in the zinc sulfate liquors, difficulties will be encountered in the control of some of these properties.

Lithopone should be slightly alkaline and for that reason an excess of alkaline barium sulfide liquor is employed in the main precipitation step. An alkalinity of the order disclosed in United States Letters Patent No. 1,446,637 is particularly desirable in order to secure a finished lithopone that is readily wetted by or incorporated in such vehicles as oil or varnish. An excess of barium hydrate in the crude lithopone during the drying and calcination operations serves to prevent oxidation of the zinc sulfide; to absorb such acid gases as $CO_2$, $SO_2$, $SO_3$, etc., which may be present in the air or result from oxidation of sulfur compounds; and to maintain a fairly constant alkalinity in the finished product. If, in the case of a lithopone made from zinc sulfate liquor containing magnesium sulfate, the barium hydrate removed, destroyed or decreased has not been replaced, the lithopone after calcination may be low or non-uniform in alkalinity; or, if the barium hydrate has been replaced, the lithopone after calcination may be high in alkalinity, due to the combined alkalinity of the barium hydrate and the magnesium hydrate. Excessive alkalinity causes the finished lithopone when incorporated in vehicles, such as oil or varnish, to liver and thicken as well as turn yellow. Adjustments may, of course, be made in the case of low alkalinity by the addition to the lithopone after calcination of suitable agents, such as barium hydrate, or in the case of excessive alkalinity by additions of acids. These procedures, however, involve time and expense and may be injurious to other properties of the lithopone product.

The calcined lithopone is quenched in water, washed, wet-ground, filtered, dried, disintegrated, and packed. Should the lithopone be off-color, slightly yellow instead of white, the tint is usually improved by the addition to the slurry after grinding of very small amounts of ultramarine blue. The effectiveness of ultramarine blue is, however, seriously impaired if the slurry contains magnesium compounds. The sensitivity of the ultramarine blue to fading is materially increased by the presence of some magnesium compounds.

The presence of magnesium compounds in the finished product has a tendency to cause livering or thickening when it is ground or otherwise incorporated in such vehicles as oil or varnish; for example, in the preparation of paste for the manufacture of paint. This livering or thickening may be due to the combination of magnesium with the free fatty acids present in the oil vehicle to form insoluble magnesium soaps or the like.

The present invention contemplates the substantial elimination of magnesium or its compounds from materials entering into the manufacture of pigments by wet-precipitation. To this end the materials going into the process and contaminated with magnesium or its compounds, are treated in such manner as to remove the objectionable impurity in substantial amounts, either before and/or during and/or after the pigment making process.

In accordance with the practice of the present invention, in the case of lithopone, the reaction between the "barium sulfide" and zinc sulfate liquors is terminated before an appreciable amount of magnesium compounds is precipitated. The invention also contemplates the removal of magnesium compounds from the crude pulp of co-precipitated zinc sulfide and barium sulfate, or the crude lithopone. To this end, the magnesium compounds present in the co-precipitate are converted into water-soluble compounds, which are then removed from the solids by washing or leaching with water or the like.

The usual practice in manufacturing lithopone is to run alkaline "barium sulfide" liquor into the zinc sulfate liquor, until all of the zinc has been converted to zinc sulfide, according to Equation (1) above. Since it is desired to have an alkaline product, an excess of "barium sulfide" liquor is employed.

When zinc sulfate liquors are prepared from materials containing magnesium or its compounds, magnesium sulfate is also formed. The result is a mixture of zinc and magnesium sulfates in solution. Since the usual methods and means employed to purify the zinc sulfate liquor do not effect the removal of magnesium, at least in appreciable amounts, the magnesium sulfate is also present during the main precipitation step.

Our investigations have shown that "barium sulfide" liquor has a tendency to react with the zinc sulfate, before reacting with the magnesium sulfate present in the zinc sulfate liquor. In other words, barium sulfide appears selectively to react with zinc sulfate before attacking the magnesium sulfate. Once the zinc available in the zinc sulfate has been satisfied, the magnesium goes into reaction with further additions of barium sulfide liquor.

The present invention contemplates the utilization of this tendency for two successive reactions—a main and a secondary reaction—to take place when "barium sulfide" liquor and magnesium-zinc sulfate liquor are brought together. In the present preferred practice of the invention, barium sulfide liquor is conducted into a body of magnesium-zinc-sulfate liquor, maintained in a so-called precipitation tank, in amount sufficient to convert substantially all of the available zinc to zinc sulfide, but insufficient to convert appreciable amounts of the available magnesium to magnesium hydrate.

Suitable qualitative tests are made from time to time to determine the end point of the main reaction. Since it is desired to avoid adding any undue excess of barium sulfide liquor, because of the secondary reaction which throws down magnesium hydrate, it is necessary to terminate the reaction at approximately the time when all, or substantially all, of the available zinc has been satisfied.

The endpoint of the main reaction may be determined by taking test portions of the crude pulp from the precipitation tank, from time to time, as the reaction moves toward completion, and promptly analyzing the filtrate from the crude pulp for the presence of any zinc. This may be accomplished, for example, by filtering the test portion to separate the solids (zinc sulfide and barium sulfate) from the liquid. The liquid, or filtrate, portion is then tested for the presence of zinc. Thus, a few drops of potassium ferrocyanide may be added to about 10 cc. of the filtrate. If zinc is present in the filtrate, a white precipitate of zinc ferrocyanide will result. This precipitate is evidence that the main body of zinc sulfate in the precipitation tank has not yet been completely converted to zinc sulfide.

As the main reaction nears completion, the filtrate from test portions of the reacting liquors will show less and less evidence of zinc ferrocyanide when drops of potassium ferrocyanide are added thereto. The additions of "barium sulfide" liquor to the main body of magnesium-zinc sulfate liquor are then made smaller and slower until the end point of the main reaction has been approximately reached. Should the filtrate from test portions show no indication of zinc whatever, that is evidence that all of the zinc in the precipitating tank has been converted to zinc sulfide.

It will, of course, be apparent that the additions of "barium sulfide" liquor to the main body of magnesium-zinc-sulfate liquor may be terminated before, at, or after the end point of the main reaction. In practice, however, it is preferable to stop the barium sulfide additions as close as possible at the end point of the main reaction.

The ideal situation, of course, obtains when the "barium sulfide" liquor additions are stopped exactly at the end point of the main reaction. Under such circumstances all of the available zinc is converted to zinc sulfide, and there is little or no magnesium hydrate formed. Such exact control of the precipitation step may, however, be impossible in daily plant practice.

If the additions of "barium sulfide" liquor to the magnesium-zinc-sulfate liquor are terminated just after the main reaction has gone to completion, very little magnesium hydrate is formed by the secondary reaction. The amount of magnesium hydrate formed depends on the amount of magnesium sulfate present in the zinc sulfate liquor and on the excess amount of barium sulfide liquor added. If an appreciable amount of magnesium hydrate has not been formed, its presence in the crude pulp may be ignored. On the other hand, if a harmful amount of magnesium hydrate has been formed by overrunning the end point, partially corrective measures may be applied. It is, of course, not practicable to redissolve the barium sulfate which has been precipitated from the magnesium sulfate along with the magnesium hydrate, but the magnesium hydrate may be converted to magnesium sulfate by the addition of sulfuric acid or acidulated zinc sulfate liquor or by the use of wash water acidulated with sulfuric acid in the subsequent washing operation.

The crude pulp is then preferably treated for the hydrate-sulfhydrate control contemplated by the aforementioned co-pending applications. To this end the crude pulp may first be appropriately washed for the removal of magnesium compounds in solution, such as the unaffected magnesium sulfate originally present in the zinc sulfate liquor. The purified crude pulp, consisting principally of co-precipitated zinc sulfide and barium sulfate and water, may then be treated with barium sulfide in amount and content sufficient to provide the desired excess and ratio of hydrate to sulfhydrate. As indicated in said co-pending applications, this excess and ratio of hydrate to sulfhydrate may be determined and established by various corrective measures, and in varying excesses and ratios depending upon the particular physical properties desired in the finished lithopone product.

In our preferred practice of the invention, the purified crude pulp after washing and treatment with "barium sulfide" liquor to the desired ratio and excess of hydrate and sulfhydrate is also made to contain an appropriate electrolyte, such as sodium chloride, in suitable amounts, as is more particularly disclosed in United States Letters Patent No. 1,411,645. The crude pulp is filtered and dried and the resulting crude lithopone is then calcined in the manner disclosed in this patent in order to obtain a pigment that is substantially light resistant. The slurry obtained in the quenching operation may be treated with ultramarine blue, if desirable. Suitable corrections are then made, if necessary, to give the finished product an alkalinity of the order specified in the aforementioned Patent No. 1,446,637.

The net result is to obtain a highly satisfactory lithopone pigment by substantially eliminating the presence of appreciable amounts of objectionable magnesium or its compounds during the lithopone making process. Moreover, the practice of the invention makes possible the use of zinc-bearing materials that would otherwise not be acceptable in lithopone manufacture because of the deleterious effects of magnesium.

While the above description is more particularly directed to the practice of the invention in the manufacture of lithopone, the principles of the invention are also applicable to the manufacture of other pigments by wet-precipitation. Thus, substantially the same problems are involved in the manufacture of zinc sulfide by wet processes. When zinc sulfide is made, for example, by bringing together aqueous solutions of "barium sulfide" and zinc chloride, a precipitate of zinc sulfide results:

(10)  $BaS + ZnCl_2 \rightarrow ZnS + BaCl_2$

The precipitate is filtered, washed substantially clear of the barium chloride in solution, dried and calcined according to the usual practice.

If the zinc chloride liquor is contaminated with magnesium chloride in solution, for example, and the precipitating reaction is carried to substantial completion, magnesium hydrate is also thrown down with the zinc sulfide.

(11) $MgCl_2 + Ba(OH)_2 \rightarrow \underline{Mg(OH)_2} + BaCl_2$

(12) $2MgCl_2 + Ba(OH)_2 + Ba(SH)_2 + 2H_2O \rightarrow 2BaCl_2 + 2\underline{Mg(OH)_2} + 2H_2S$ This magnesium hydrate exerts substantially the same deleterious effects on the zinc sulfide making process as it does in the case of the lithopone making process, particularly when the two processes are carried on in substantially the same manner. It is therefore advisable to inhibit the formation of magnesium hydrate, in the zinc sulfide making process, and to eliminate its presence in the final product. This may be accomplished in the practice of the present invention.

We claim:

1. In the method of manufacturing lithopone, the steps which comprise bringing together aqueous solutions of barium sulfide and zinc sulfate, at least one of said solutions containing a precipitable magnesium compound in solution, and terminating the main reaction between the barium sulfide and the zinc sulfate before an appreciable amount of magnesium compound is precipitated.

2. In the method of manufacturing lithopone, the steps which comprise bringing together barium sulfide and magnesium-zinc-sulfate liquors in amount insufficient to complete the main reaction between barium sulfide and zinc sulfate, separating the liquid portion of the mixture containing magnesium-zinc-sulfate in solution from the co-precipitate of zinc sulfide and barium sulfate, and treating the co-precipitate with more barium sulfide liquor.

3. In the method of manufacturing lithopone, the steps which comprise terminating the reaction between barium sulfide and magnesium-zinc sulfate liquors before an appreciable amount of magnesium hydrate is formed, removing the magnesium sulfate solution from the co-precipitate formed by the reaction, and establishing a predetermined excess of hydrate in the crude pulp.

4. In the method of manufacturing lithopone, the steps which comprise terminating the reaction between barium sulfide and magnesium-zinc sulfate liquors before an appreciable amount of magnesium hydrate is formed, removing the magnesium sulfate solution from the co-precipitate formed by the reaction, and establishing a predetermined excess and ratio of hydrate to sulfhydrate in the crude pulp.

5. In the method of manufacturing lithopone, the steps which comprise terminating the reaction between barium sulfide and magnesium-zinc sulfate liquors before an appreciable amount of magnesium hydrate is formed, removing the magnesium sulfate solution from the co-precipitate formed by the reaction, and establishing a predetermined excess and ratio of hydrate to sulfhydrate in the crude pulp by the addition of a suitable amount and content of barium sulfide liquor to the washed co-precipitate.

6. In the method of manufacturing lithopone, the steps which comprise bringing together barium sulfide and magnesium-zinc sulfate liquors to form a co-precipitate of zinc sulfide and barium sulfate, terminating the reaction between the reacting liquors to prevent the formation of an excessive amount of magnesium hydrate, treating the crude co-precipitate with sulfuric acid to render the magnesium compounds water-soluble, and removing the water-soluble magnesium compounds from the co-precipitate of zinc sulfide and barium sulfate.

7. In the method of manufacturing a pigment containing precipitated zinc sulfide from a zinc salt solution contaminated with a precipitable magnesium compound, the steps which comprise precipitating zinc sulfide from the zinc salt solution with a metallic water-soluble sulfide, and terminating the reaction before an appreciable amount of magnesium compound is precipitated.

8. In the method of manufacturing zinc sulfide pigment, the steps which comprise bringing together aqueous solutions of barium sulfide and zinc chloride containing a precipitable compound of magnesium in solution, and terminating the main reaction between the barium sulfide and the zinc chloride before an appreciable amount of magnesium compound is precipitated.

WILLIAM C. HOOEY.
EDMUND J. FLYNN.